March 6, 1962    I. C. SANDBACK    3,023,672
WIDE ANGLE OBJECTIVE
Filed Oct. 9, 1958    2 Sheets-Sheet 1

Inventor:
Irving C. Sandback
By Robert F. Miehle, Atty.

March 6, 1962  I. C. SANDBACK  3,023,672
WIDE ANGLE OBJECTIVE

Filed Oct. 9, 1958  2 Sheets-Sheet 2

Inventor:
Irving C. Sandback
By Robert F. Michie, Atty.

United States Patent Office 3,023,672
Patented Mar. 6, 1962

3,023,672
WIDE ANGLE OBJECTIVE
Irving C. Sandback, Morton Grove, Ill., assignor to Bell & Howell Company, Chicago, Ill., a corporation of Illinois
Filed Oct. 9, 1958, Ser. No. 766,251
5 Claims. (Cl. 88—57)

This invention relates to a wide angle objective, and more particularly to a wide angle photographic objective of the inverted telephoto type highly corrected for all aberrations.

An object of the invention is to provide a wide angle objective having a long back focal length and highly corrected for astigmatism, chromatic variation of astigmatism and distortion as well as for the other optical aberrations.

Another object of the invention is to provide a new and improved inverted telephoto objective having a negative power group of elements positioned a substantial distance in front of the stop and a positive power group of elements closely following the stop and having a long back focal length.

A further object of the invention is to provide a wide angle objective having five components of which the first is a convex-plano positive singlet of extra dense barium flint glass, the second a negative meniscus of barium flint glass and forming a negative group positioned substantially ahead of the stop, the third is a positive meniscus singlet behind the stop, the fourth a compound positive doublet and the fifth a positive member of either singlet or doublet form.

It is to be understood that the terms "front" and "rear" as herein used refer to the ends of the objective respectively nearer the longer and shorter conjugates thereof.

Figure 1:
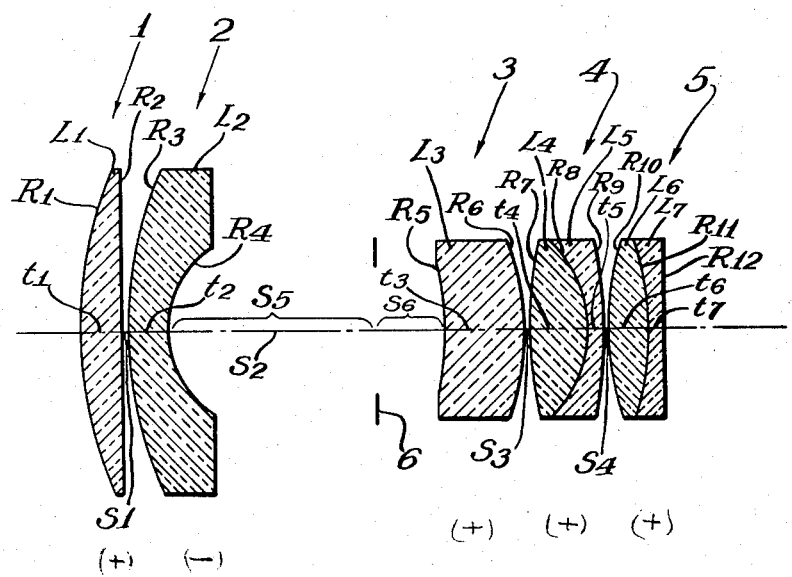
Figure 2:
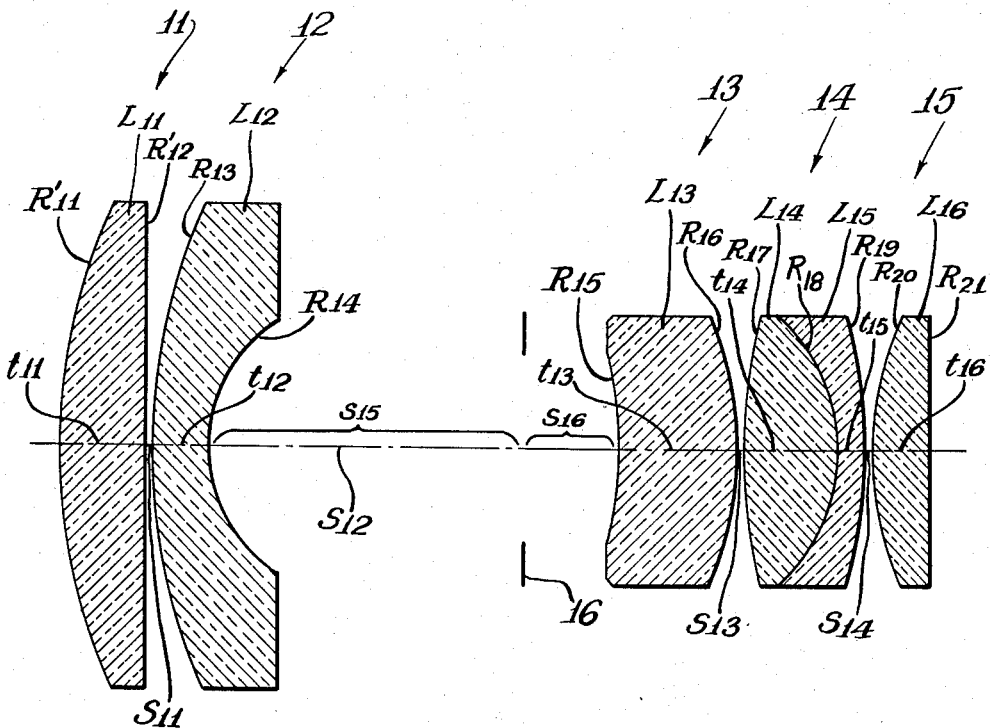

In the drawings, FIGS. 1 and 2 are longitudinal sections illustrating objectives forming two embodiments of the invention.

The invention provides a wide angle objective of the inverted telephoto type including a negative front group of components spaced substantially in front of a stop and a positive rear group of components spaced closely behind the stop. Proceeding from the front to rear the front group includes a front convex plano singlet of extra dense barium flint glass and a rear negative meniscus singlet of barium flint glass concave to the stop. The rear group of components includes a front positive meniscus component concave to the stop, an intermediate biconvex compound doublet and a rear positive component which may be a convex-substantially plano compound doublet convex to the stop or a convex-plano singlet convex to the stop.

Referring to FIG. 1 of the drawings, the objective shown therein includes components 1 to 5 having lenses $L_1$ to $L_7$, radii of curvature of the surfaces $R_1$ to $R_{12}$, axial thicknesses $t_1$ to $t_7$ and axial separations $s_1$ to $s_4$. The components 1 and 2 are closely spaced and form a negative group positioned a substantial distance $s_5$ in front of stop 6 with the components most convex toward incident light. The front group of components 1 and 2 is formed of two lenses for chromatic correction. To substantially completely eliminate higher order aberrations of chromatic astigmatism and distortion, the surfaces $R_1$, $R_3$ and $R_4$ are strongly convex to the incident light and the lens $L_1$ must be of extra dense barium flint glass and the lens $L_2$ must be of barium flint glass having an Abbe dispersion number of not greater than about 50 and not less than about 40. Also, the surface $R_2$ must not be strongly convex and preferably is plano or slightly concave.

The components 3 to 5 are closely spaced to one another and are spaced a short distance $s_6$ behind the stop 6. The front component 3 of the rear group is a positive meniscus singlet concave toward the stop, the intermediate component 4 a positive cemented or air spaced doublet $L_4$ and $L_5$ with its optical surfaces as concave to the stop as possible. The rear component 5 is composed of a cemented or air spaced doublet having convex front lens $L_6$ and a meniscus rear lens $L_7$.

To highly correct astigmatism and distortion for half angle fields to view of 30° and greater and to minimize variation of astigmatism and distortion over such fields of view, the lens $L_1$ is constructed of extra dense barium flint glass with an Abbe dispersion number which is from 10 to 25 greater than that of the lens $L_1$. Preferably, the lens $L_2$ has an Abbe dispersion number not greater than about 50 and not less than about 40. The optical surfaces of the lens $L_1$ and $L_2$ are positioned to be highly convex to incident light which, as shown in the drawings, is from the left.

The positive rear group of elements 3, 4 and 5 are spaced very closely together with the surfaces $R_5$, $R_6$, $R_7$, $R_9$ and $R_{10}$ being so curved that the deviations of the light rays passing therethrough from the stop are very small. Thus, the surfaces $R_5$ and $R_6$ are concave to the stop as the light path is expanding from the stop. The surface $R_7$ is convex to the stop and receives the light rays converging somewhat from the lens $L_3$, and the surface $R_{10}$ also is convex to the stop to receive the converging rays with minimum deviations from perpendiculars to the surface $R_{10}$ also is convex to the stop to receive the converging rays with minimum deviations from perpendiculars to the surfaces $R_{10}$.

For high correction the objective should comply with the following inequalities in which F is the equivalent focal length thereof, and $f_1$ to $f_5$ are the focal lengths of the respective components 1 to 5:

$$2.6F < R_1 < 3.6F$$

$$-\frac{.025}{F} < \frac{1}{R_2} < \frac{.05}{F}$$

$$.2 < \frac{R_4}{R_3} < .3$$

$$.6F < R_4 < .9F$$

$$.2 < \frac{R_4}{R_1} < .3$$

$$1.6F < R_6 < 2.2F$$

$$.75 < \frac{R_5}{R_6} < .9$$

$$2.9F < R_7 < 3.7F$$

$$.6 < \frac{R_7}{R_8} < 1.3$$

$$1.8F < R_9 < 2.3F$$

$$1.6F < R_{10} < 2.5F$$

$$-\frac{.025}{F} < \frac{1}{R_{12}} < \frac{.025}{F}$$

$$3.4F < f_1 < 4.6F$$

$$1.4F < -f_2 < 2.0F$$

$$7.5F < f_3 < 10.5F$$

$$2.3F < f_4 < 3.2F$$

$$3.2F < f_5 < 4.4F$$

A preferred example of the objective shown in FIG. 1 complies substantially with the following table in which dimensions are in terms of inches, $n_d$ designates the respective indices of refraction for the sodium D line and V the Abbe dispersion numbers:

*Example I*

[Equivalent focal length=.496  Back focal length=.686  Aperture f/1.7]

| | | | | |
|---|---|---|---|---|
| $L_1$ | $R_1 = +1.559$ | $t_1 = .175$ | $n_d = 1.720$ | $V = 29.3$ |
| | $R_2 = $ Plano | $s_1 = .025$ | | |
| $L_2$ | $R_3 = 1.500$ | $t_2 = .150$ | $n_d = 1.611$ | $V = 45.0$ |
| | $R_4 = .3805$ | | | |
| | | $s_5 = .820$ | | |
| | | $s_6 = .282$ | | |
| | | $s_2 = 1.102$ | | |
| $L_3$ | $R_5 = -1.144$ | $t_3 = .330$ | $n_d = 1.734$ | $V = 51.2$ |
| | $R_6 = -.950$ | $s_3 = .005$ | | |
| $L_4$ | $R_7 = +1.559$ | $t_4 = .225$ | $n_d = 1.657$ | $V = 51.0$ |
| | $R_8 = -.464$ | | | |
| $L_5$ | $R_9 = -1.664$ | $t_5 = .060$ | $n_d 1.720$ | $V = 29.3$ |
| | $R_{10} = +1.110$ | $s_4 = .005$ | | |
| $L_6$ | $R_{11} = -1.110$ | $t_6 = .150$ | $n_d = 1.671$ | $V = 47.4$ |
| $L_7$ | $R_{12} = $ Plano | $t_7 = .060$ | $n_d = 1.720$ | $V = 29.3$ |

The objective shown in FIG. 2 is generally similar to that shown in FIG. 1 with the exception that the rear component 15 is a convex plano singlet. The objective shown in FIG. 2 includes components 11 to 15 having lenses $L_{11}$ to $L_{16}$, radii of curvature of the optical surfaces $R_{11}$ to $R_{21}$, axial thicknesses $s_{11}$ to $s_{14}$ and axial separations $s_{15}$ and $s_{16}$ from a stop 16. For high correction, the objective shown in FIG. 2 should conform to the following inequalities, wherein F is the equivalent focal length of the objective and $f_{11}$ to $f_{15}$ correspond to the respective focal lengths of the components 11 to 15.

$$2.6F < R'_{11} < 3.6F$$

$$-\frac{.025}{F} < \frac{1}{R'_{12}} < \frac{.05}{F}$$

$$.2 < \frac{R_{14}}{R_{13}} < .3$$

$$.6F < R_{14} < .9F$$

$$.2 < \frac{R_{14}}{R'_{11}} < .3$$

$$1.6F < R_{16} < 2.2F$$

$$.75 < \frac{R_{15}}{R_{16}} < .9$$

$$2.9F < R_{17} < 3.7F$$

$$.6 < \frac{R_{17}}{R_{18}} < 1.3$$

$$1.8F < R_{19} < 2.3F$$

$$1.6F < R_{20} < 2.5F$$

$$-\frac{.025}{F} < \frac{1}{R_{21}} < \frac{.025}{F}$$

$$3.4F < f_{11} < 4.6F$$

$$1.4F < -f_{12} < 2.0F$$

$$7.5F < f_{13} < 10.5F$$

$$2.3F < f_{14} < 3.2F$$

$$3.2F < f_{15} < 4.4F$$

Preferred examples of the objective shown in FIG. 2 are constructed in conformity with the following tables in which dimensions are in terms of inches and $n_d$ designates the indices of refraction for the sodium D line and V the Abbe dispersion numbers:

*Example II*

[Equivalent focal length=.496  Back focal length=.686  Aperture f/1.7]

| | | | | |
|---|---|---|---|---|
| $L_{11}$ | $R'_{11} = +1.559$ | $t_{11} = .175$ | $n_d = 1.720$ | $V = 29.0$ |
| | $R'_{12} = $ Plano | $s_{11} = .025$ | | |
| | $R_{13} = +1.500$ | | | |
| $L_{12}$ | $R_{14} = +.3805$ | $t_{12} = .150$ | $n_d = 1.611$ | $V = 45.0$ |
| | | $s_{15} = .820$ | | |
| | | $s_{16} = .282$ | | |
| | | $s_{12} = 1.102$ | | |
| $L_{13}$ | $R_{15} = -1.000$ | $t_{13} = .306$ | $n_d = 1.734$ | $V = 51.2$ |
| | $R_{16} = -.862$ | $s_{13} = .005$ | | |
| | $R_{17} = +1.520$ | | | |
| $L_{14}$ | $R_{18} = -.464$ | $t_{14} = .250$ | $n_d = 1.620$ | $V = 60.0$ |
| $L_{15}$ | | $t_{15} = .080$ | $n_d = 1.720$ | $V = 29.3$ |
| | $R_{19} = +1.333$ | | | |
| | $R_{20} = +.951$ | $s_{14} = .005$ | | |
| $L_{16}$ | $R_{21} = $ Plano | $t_{16} = .100$ | $n_d = 1.517$ | $V = 64.5$ |

*Example III*

[Equivalent focal length=.500  Back focal length=.718  Aperture f/1.7]

| | | | | |
|---|---|---|---|---|
| $L_{11}$ | $R'_{11} = +1.440$ | $t_{11} = .232$ | $n_d = 1.720$ | $V = 29.3$ |
| | $R'_{12} = +28.628$ | $s_{11} = .010$ | | |
| | $R_{13} = +1.498$ | | | |
| $L_{12}$ | $R_{14} = +.3796$ | $t_{12} = .156$ | $n_d = 1.612$ | $V = 45.0$ |
| | | $s_{15} = .820$ | | |
| | | $s_{16} = .260$ | | |
| | | $s_{12} = 1.080$ | | |
| $L_{13}$ | $R_{15} = -1.000$ | $t_{13} = .316$ | $n_d = 1.697$ | $V = 56.2$ |
| | $R_{16} = -.862$ | $s_{13} = .005$ | | |
| | $R_{17} = +1.520$ | | | |
| $L_{14}$ | $R_{18} = -.464$ | $t_{14} = .250$ | $n_d = 1.620$ | $V = 60.0$ |
| $L_{15}$ | $R_{19} = -1.340$ | $t_{15} = .080$ | $n_d = 1.720$ | $V = 29.3$ |
| | $R_{20} = +.950$ | $s_{14} = .005$ | | |
| $L_{16}$ | $R_{21} = $ Plano | $t_{16} = .160$ | $n_d = 1.517$ | $V = 64.5$ |

While the invention is thus described, it is not wished to be limited to the precise details described, as changes may be readily made without departing from the spirit of the invention.

What is claimed is:

1. In an inverted telephoto lens system, proceeding from front to rear, a front convex-plano component convex to the front of extra dense barium flint glass, a second negative meniscus component of barium flint glass and positioned closely behind the front component and convex to the front, a stop, a positive meniscus component concave forwardly, a compound positive component, and a rear positive component and being further characterized in that the lens system is constructed in substantial compliance with the following inequalities in which proceeding from front to rear $R_1$ and $R_3$ designate the respective radii of curvature of the front surfaces of the front and second components, $R_2$ the radius of the rear surface of the front component, $R_4$ the radius of the rear surface of the second component, $R_5$ and $R_6$ the radii of the front and rear surfaces of the third component, $R_7$, $R_8$, and $R_9$ the radii of the front, inner and rear surfaces of the fourth component and $R_{10}$ and $R_{12}$ the front and rear radii of the rear component, and F is the equivalent focal length of the lens system:

$$2.6F < R_1 < 3.6F$$

$$-\frac{.025}{F} < \frac{1}{R_2} < \frac{.05}{F}$$

$$.2 < \frac{R_4}{R_3} < .3$$

$.6F < R_4 < .9F$ $.2 < \dfrac{R_4}{R_1} < .3$ $1.6F < R_6 < 2.2F$ $.75 < \dfrac{R_5}{R_6} < .9$ $2.9F < R_7 < 2.7F$ $.6 < \dfrac{R_7}{R_8} < 1.3$ $1.8F < R_9 < 2.3F$ $1.6F < R_{10} < 2.5F$ $-\dfrac{.025}{F} < \dfrac{1}{R_{12}} < \dfrac{.025}{F}$ 2. In an inverted telephoto lens system, proceeding front front to rear, a front convex-plano component convex to the front of extra dense barium flint glass, a second negative meniscus component positioned closely behind the front component and convex to the front, a stop, a positive meniscus third component concave forwardly, a compound positive fourth component, and a rear positive component and being further characterized in that the lens system is constructed in substantial compliance with the following inequalities in which proceeding from front to rear $R'_{11}$ and $R_{13}$ designate the respective radii of curvature of front surfaces of the front and second components, $R'_{12}$ the radius of curvature of the rear surface of the front component, $R_{14}$ the radius of the rear surface of the second component, $R_{15}$ and $R_{16}$ the radii of the front and rear surfaces of the third component, $R_{17}$, $R_{18}$ and $R_{19}$ the radii of the front, inner and rear surfaces of the fourth component, and $R_{20}$ and $R_{21}$ the radii of curvature of the front and rear surfaces of the rear component, and F is the equivalent focal length of the lens system:

$2.6F < R'_{11} < 3.6F$ $-\dfrac{.25}{F} < \dfrac{1}{R'_{12}} < .2F$ $.2 < \dfrac{R_{14}}{R_{12}} < .3$ $.6F < R_{14} < .9F$ $.2 < \dfrac{R_{14}}{R'_{11}} < .3$ $1.6F < R_{16} < 2.2F$ $.75 < \dfrac{R_{15}}{R_{16}} < .9$ $2.9F < R_{17} < 3.7F$ $.6 < \dfrac{R_{17}}{R_{18}} < 1.3$ $1.8F < R_{19} < 2.3F$ $1.6F < R_{20} < 2.5F$ $-\dfrac{.025}{F} < \dfrac{1}{R_{21}} < \dfrac{.025}{F}$ 3. In a wide angle objective, proceeding from front to rear, a front positive singlet, a second negative meniscus singlet, a stop, a third positive meniscus singlet, a fourth compound positive doublet, and a rear positive compound doublet, and further characterized in that the objective complies substantially with the following table in which dimensions are in terms of inches and proceeding from front to rear $L_1$ to $L_7$ designate the lenses, $R_1$ to $R_{12}$ the radii of curvature of the surfaces, $t_1$ to $t_7$ the axial thicknesses, $s_1$ to $s_4$ the axial separations of the lenses, $n_d$ the refractive indices of refraction for the sodium D line and V the Abbe dispersion numbers:

[Equivalent focal length=.496   Back focal length=.686   Aperture f/1.7]

|     |              |             |             |         |
|-----|--------------|-------------|-------------|---------|
| $L_1$ | $R_1 = +1.559$ | $t_1 = .175$ | $n_d=1.720$ | $V=29.3$ |
|     | $R_2 =$ Plano  | $s_1 = .025$ |             |         |
| $L_2$ | $R_3 = +1.500$ | $t_2 = .150$ | $n_d=1.611$ | $V=45.0$ |
|     | $R_4 = +.3805$ | $s_2 = 1.102$ |             |         |
| $L_3$ | $R_5 = -1.144$ | $t_3 = .330$ | $n_d=1.734$ | $V=51.2$ |
|     | $R_6 = -.950$  | $s_3 = .005$ |             |         |
| $L_4$ | $R_7 = +1.559$ | $t_4 = .225$ | $n_d=1.657$ | $V=51.0$ |
|     | $R_8 = -.464$  | $t_5 = .060$ | $n_d=1.720$ | $V=29.3$ |
| $L_5$ | $R_9 = -1.664$ | $s_4 = .005$ |             |         |
|     | $R_{10}= +1.110$ |           |             |         |
| $L_6$ | $R_{11}= -1.110$ | $t_6 = .150$ | $n_d=1.671$ | $V=47.4$ |
| $L_7$ |              | $t_7 = .060$ | $n_d=1.720$ | $V=29.3$ |
|     | $R_{12}=$ Plano |           |             |         |

4. In a wide angle objective, proceeding from front to rear, a front positive singlet, a negative meniscus singlet, a stop, a positive meniscus singlet, a compound positive doublet, and a rear positive singlet, and further characterized in that the objective complies substantially with the following table in which dimensions are in terms of inches and proceeding from front to rear $L_{11}$ to $L_{16}$ designate the lenses, $R'_{11}$ to $R_{21}$ the radii of curvature of the surfaces, $t_{11}$ to $t_{16}$ the axial thicknesses, $s_{11}$ to $s_{14}$ the axial separations of the lenses, $n_d$ the refractive indices of refraction for the sodium D line and V the Abbe dispersion numbers:

[Equivalent focal length=.496   Back focal length=.686   Aperture f/1.7]

|     |                 |              |             |          |
|-----|-----------------|--------------|-------------|----------|
| $L_{11}$ | $R'_{11}= +1.559$ | $t_{11}= .175$ | $n_d=1.720$ | $V=29.0$ |
|     | $R'_{12}=$ Plano  | $s_{11}= .025$ |             |          |
| $L_{12}$ | $R_{13}= +1.500$ | $t_{12}= .150$ | $n_d=1.611$ | $V=45.0$ |
|     | $R_{14}= +.3805$  | $s_{12}=1.102$ |             |          |
| $L_{13}$ | $R_{15}= -1.000$ | $t_{13}= .306$ | $n_d=1.734$ | $V=51.2$ |
|     | $R_{16}= -.862$   | $s_{13}= .005$ |             |          |
| $L_{14}$ | $R_{17}= +1.520$ | $t_{14}= .250$ | $n_d=1.620$ | $V=60.0$ |
| $L_{15}$ | $R_{18}= -.464$   | $s_{15}= .080$ | $n_d=1.720$ | $V=29.3$ |
|     | $R_{19}= +1.333$  | $s_{14}= .005$ |             |          |
| $L_{16}$ | $R_{20}= +.951$  | $t_{16}= .100$ | $n_d=1.517$ | $V=64.5$ |
|     | $R_{21}=$ Plano  |              |             |          |

5. In a wide angle objective, proceeding from front to rear, a front positive singlet, a negative meniscus singlet, a stop, a positive meniscus singlet, a compound positive doublet, and a rear positive singlet, and further characterized in that the objective complies substantially with the following table in which dimensions are in terms of inches and proceeding from front to rear $L_1$ to $L_6$ designate the lenses, $R'_{11}$ to $R_{21}$ the radii of curvature of the surfaces, $t_{11}$ to $t_{16}$ the axial thicknesses, $s_{11}$ to $s_{14}$ the axial separations of the lenses, $n_d$ the refractive indices of refraction for the sodium D line and V the Abbe dispersion numbers:

[Equivalent focal length=.500   Back focal length=.718
Aperture f/1.7]

| | | | | |
|---|---|---|---|---|
| $L_{11}$ | $R'_{11}=+1.440$ | $t_{11}=.232$ | $n_d=1.720$ | $V=29.3$ |
| | $R'_{12}=+28.628$ | $s_{11}=.010$ | | |
| $L_{12}$ | $R_{13}=+1.498$ | $t_{12}=.156$ | $n_d=1.612$ | $V=45.0$ |
| | $R_{14}=+.3796$ | $s_{12}=1.080$ | | |
| $L_{13}$ | $R_{15}=-1.000$ | $t_{13}=.316$ | $n_d=1.697$ | $V=56.2$ |
| | $R_{16}=-.862$ | $s_{13}=.005$ | | |
| $L_{14}$ | $R_{17}=+1.520$ | $t_{14}=.250$ | $n_d=1.620$ | $V=60.0$ |
| $L_{15}$ | $R_{18}=-.464$ | $t_{15}=.080$ | $n_d=1.720$ | $V=29.3$ |
| | $R_{19}=-1.340$ | $s_{14}=.005$ | | |
| $L_{16}$ | $R_{20}=+.950$ | $t_{16}=.160$ | $n_d=1.517$ | $V=64.5$ |
| | $R_{21}=$ Plano | | | |

References Cited in the file of this patent
UNITED STATES PATENTS

| | | |
|---|---|---|
| 1,897,262 | Kitroser | Feb. 14, 1933 |
| 1,955,590 | Lee | Apr. 17, 1934 |
| 2,126,126 | Merte | Aug. 9, 1938 |
| 2,594,020 | Hopkins et al. | Apr. 22, 1952 |
| 2,594,021 | Hopkins et al. | Apr. 22, 1952 |
| 2,649,022 | Angenieux | Aug. 18, 1953 |
| 2,696,758 | Angenieux | Dec. 14, 1954 |
| 2,793,565 | Zollner et al. | May 28, 1957 |
| 2,821,112 | Lautenbacher et al. | Jan. 28, 1958 |
| 2,826,115 | Lange | Mar. 11, 1958 |